United States Patent [19]
Goto et al.

[11] Patent Number: 5,551,333
[45] Date of Patent: Sep. 3, 1996

[54] AUTOMATIC COOKING APPARATUS

[75] Inventors: Hisashi Goto; Tatsuya Hirano; Shinichi Kobayashi, all of Mie, Japan

[73] Assignee: Fuji Electric Co., Ltd., Kawasaki, Japan

[21] Appl. No.: 546,440

[22] Filed: Oct. 20, 1995

[30] Foreign Application Priority Data

Oct. 27, 1994 [JP] Japan .................................. 6-263414
Feb. 28, 1995 [JP] Japan .................................. 7-064828

[51] Int. Cl.⁶ .......................... A21C 9/00; A21C 11/00; A23P 1/00
[52] U.S. Cl. ................ 99/450.6; 99/450.1; 99/450.7; 99/353
[58] Field of Search ................ 99/450.1–450.8, 99/353–355, 494, 357; 426/92, 94, 297, 502; 425/376.1, 112, 511, 515, 96; 53/210, 465; 141/158, 168

[56] References Cited

U.S. PATENT DOCUMENTS

| | | | |
|---|---|---|---|
| 3,669,007 | 6/1972 | Pulici | 99/450.6 |
| 3,757,676 | 9/1973 | Pomara, Jr. | 99/450.7 X |
| 3,782,272 | 1/1974 | Cooper | 99/450.7 |
| 3,901,137 | 8/1975 | Jimenez | 99/353 |
| 4,084,493 | 4/1978 | Quintana | 426/297 X |
| 4,393,758 | 7/1983 | Anmahian | 425/511 X |
| 4,483,242 | 11/1984 | Goodman et al. | 53/210 X |
| 4,516,487 | 5/1985 | Madison et al. | 99/450.6 |
| 4,608,919 | 9/1986 | Prows et al. | 99/450.6 |
| 4,638,729 | 1/1987 | Woodworth et al. | 99/450.6 |
| 4,691,627 | 9/1987 | Roberts | 99/450.2 X |
| 5,012,726 | 5/1991 | Fehr et al. | 99/494 X |
| 5,263,407 | 11/1993 | Pomara, Jr. | 99/450.6 |

*Primary Examiner*—Timothy F. Simone
*Attorney, Agent, or Firm*—Kanesaka & Takeuchi

[57] ABSTRACT

In an automatic cooking apparatus, a wrapping paper supply device supplies a wrapping paper from a roll, and a wrapping paper folding device folds the wrapping paper along a center line thereof into a V-shape. A wrapping paper guide device guides and holds the wrapping paper folded into the V-shape, and a wrapping paper transferring device consecutively transfers the wrapping paper along the guide device in a predetermined pitch. A shell storing and delivery provides a shell folded in half one by one into the wrapping paper whenever the wrapping paper is advanced. A plurality of stuff storing and delivery devices supply a predetermined amount of food stuffs into the shell consecutively. The wrapping paper for wrapping the food item is sealed by a wrapping paper sealing device at the periphery of the food, and is cut by a wrapping paper cutting device to complete a product. The product is delivered by a product transferring device toward a product delivery outlet.

9 Claims, 13 Drawing Sheets

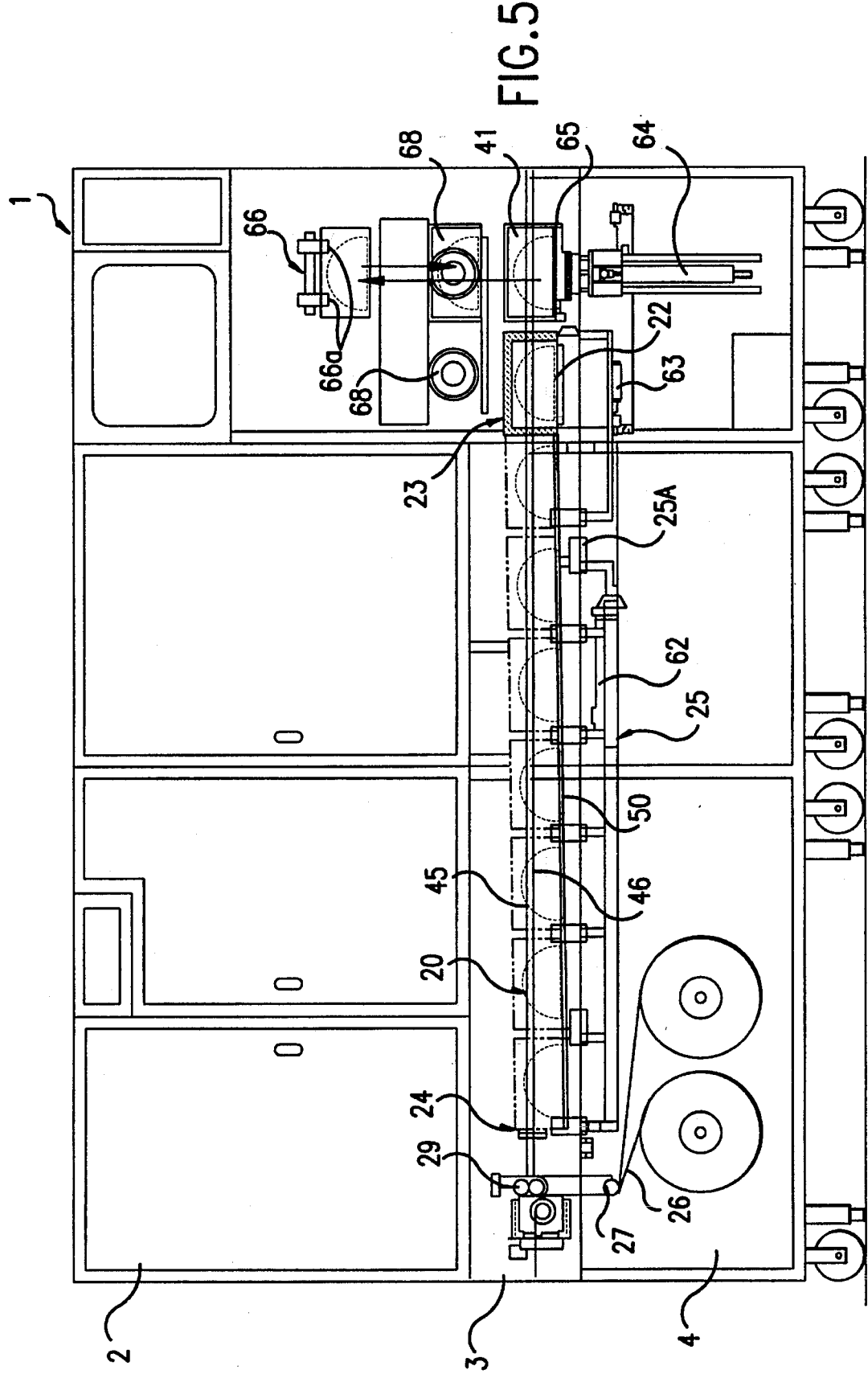

AUTOMATIC COOKING APPARATUS

BACKGROUND OF THE INVENTION AND RELATED ART STATEMENT

The present invention relates to a cooking apparatus for automatically preparing a food item prepared by putting various kinds of food stuffs into a shell or skin folded in half, and more particularly, a cooking apparatus for automatically preparing a taco.

A taco is prepared by folding a circular shell in half and putting food stuffs, such as cooked ground beef, shredded lettuce and cheese, into the shell. As the shell or skin, there are a soft type of shell called a tortilla, which is cooked by baking a flour or cornmeal mixed with liquid, and a hard type of shell called a taco shell, which is prepared by folding a shell after baking and frying the folded shell until it becomes hard. A taco using the tortilla is called a soft taco, and a taco using the taco shell is called a hard taco. Conventionally, preparation of these tacos has been done only manually. Namely, when a customer orders a taco, one sheet of a shell is taken out from a cabinet, and several kinds of food stuffs are put into the shell in order. Finally, the taco is wrapped up by a wrapping paper and handed out to the customer.

Preparation of a taco manually in the aforementioned way, however, has following problems;

(1) It takes time to put the food stuffs and to wrap the taco, so that at a peak hour, such as lunch time, customers have to wait for a long time.

(2) An amount of the stuff varies individually.

(3) Since the shredded cooking materials, such as lettuce and cheese, are scattered in the working space, it is not hygienic.

Accordingly, an object of the present invention is to provide an automatic cooking apparatus so as to obviate the foregoing problems and to automatically prepare a food item prepared by putting various kinds of food stuffs into a shell folded in half, especially preparing a taco, so that labor cost can be saved.

SUMMARY OF THE INVENTION

The aforementioned object of the present invention is achieved by providing an automatic cooking apparatus comprising wrapping paper supply means for sending out a tape-like wrapping paper; wrapping paper folding means for folding the wrapping paper along a center line thereof into a V-shape; horizontal wrapping paper guide means for guiding and holding the wrapping paper into the V-shape; wrapping paper transferring means for stepwise or consecutively advancing the wrapping paper guided by the guide means in a predetermined pitch; shell storing and delivery means disposed at a wrapping paper entry side of the wrapping paper guide means so as to provide a shell folded in half one by one into the wrapping paper whenever the wrapping paper is advanced stepwise; a plurality of stuff storing and delivery means disposed adjacent to the shell storing and delivery means in a row toward a wrapping paper exit side so as to put a predetermined amount of food stuffs into the shell in order whenever the wrapping paper is advanced stepwise; wrapping paper sealing means for jointing joining portions of the wrapping paper at a periphery of a food item completed by providing the stuffs into the shell; wrapping paper cutting means for cutting the wrapping paper for each food item; and product transferring means for transferring the food item wrapped by the wrapping paper toward a product delivery port.

In the above automatic cooking apparatus of the invention, in case second sealing means is provided to partly joint folded portions of the wrapping paper at the front and rear of the shell, the food stuffs dropped from the shell can be effectively prevented from entering into an adjacent shell area.

In the automatic cooking apparatus of the invention, in case the wrapping paper is cut away after the joining portions of the wrapping paper are sealed, there is an advantage such that the wrapping paper transferring means is made easily, as described later. On the other hand, in case the wrapping paper is cut immediately after it guided into the wrapping paper guide means, there is an alternative advantage such that the wrapping paper is not wasted, as described later.

Therefore, in an alternative embodiment of the present invention, there is provided an automatic cooking apparatus comprising wrapping paper supply means for sending out a tape-like wrapping paper; horizontal wrapping paper guide means for guiding and holding the wrapping paper; wrapping paper cutting means for cutting the wrapping paper guided into the wrapping paper guide means for a predetermined length; shell storing and delivery means disposed in a wrapping paper entry side of the wrapping paper guide means to fold the wrapping paper into a V-shape and to provide a shell folded in half one by one into the wrapping paper folded into the V-shape; wrapping paper transferring means for consecutively or stepwise advancing the wrapping paper having the shell therein at a predetermined pitch along the wrapping paper guide means; a plurality of stuff storing and delivery means disposed adjacent to the shell storing and delivery means in a row toward a wrapping paper exit side and providing a predetermined amount of food stuffs into the shell in order, whenever the wrapping paper is advanced stepwise; wrapping paper sealing means for jointing joining portions of the wrapping paper at a periphery of a food item completed by providing the stuffs; and product transferring means for transferring the food item wrapped by the wrapping paper toward a product delivery port.

Although the wrapping paper transferring means can hold either an upper end of the wrapping paper folded in the V-shape or a folded part thereof, holding the folded part of the wrapping paper is advantageous for sending the wrapping paper smoothly. Especially, in the alternative embodiment of the automatic cooking apparatus, in case the folded part of the wrapping paper is held at the front and rear portions of the shell, it is possible for the wrapping paper transferring means to have a function of the second sealing means as described later.

In the alternative embodiment of the present invention, the wrapping paper guide means is preferably formed of a plurality of wrapping paper guiding members arranged in plural levels, each wrapping paper guiding member being formed of a pair of right and left wire rods or plate members parallel to each other arranged horizontally so that the space therebetween decreases from the top to the bottom. Also, a receiving table is arranged under the center of the wrapping paper guide means parallel to the guiding members. Also, preferably, a wrapping paper introducing piece can be provided in front of a moving blade so as to introduce a distal end of the wrapping paper sent out from the wrapping paper supplying means to the guide means.

In the present invention, while the tape-like wrapping paper folded into a V-shape is advanced stepwise or consecutively along the horizontal wrapping paper guide means by the wrapping paper transferring means, shells are supplied one by one onto the wrapping paper from the shell storing and delivery mechanism. Then, various food stuffs are sequentially provided into the shell delivered from the respective stuff storing and delivery means according to the menu of a taco. Finally, the joint portions of the wrapping paper at a periphery of the taco is sealed by the wrapping paper sealing means, and after the wrapping paper for one taco is cut away by the wrapping paper cutting means, the product transferring means transfers the taco to the product delivery outlet.

According to the apparatus as described above, preparation of the taco is much faster than manual preparation of the taco, and each amount of the stuffs is fixed. Also, since the supply of the food stuffs is operated inside the wrapping paper, the stuffs dropped from the shell remain inside the wrapping paper, so that various food materials forming the stuffs will not be scattered in a kitchen space.

In the automatic cooking apparatus of the invention, the wrapping paper preliminarily folded by the wrapping paper fold means into the V-shape is introduced into the wrapping paper guide means. In case the apparatus has a structure such that the wrapping paper is cut away after sealed, the wrapping paper is continuous in a tape-like condition until the final stage. Therefore, the wrapping paper transferring means can transfer the wrapping paper along the wrapping paper guide means all together by holding only one part of the wrapping paper.

On the other hand, since the wrapping paper is continuous until the final stage, when the operation of apparatus is started or the production of the taco is interrupted, a part of the tape-like wrapping paper is not used, so that the part of the wrapping paper is wasted. To avoid such a disadvantage, the apparatus of the alternative embodiment is structured to cut the wrapping paper when the wrapping paper is introduced into the wrapping paper guide means. Accordingly, the wrapping paper necessary for preparation of the tacos can only be cut and used, so as not to waste the wrapping paper as described above. However, since the wrapping paper is cut for each taco at the early stage of the process, it is necessary to hold each sheet of the wrapping paper for sending the same.

The wrapping paper transferring means may be structured such that clamps, sprocket wheels, rollers, belts or the like hold the upper edge of the wrapping paper to consecutively advance the V-shape wrapping paper, or that clamps or the like hold the folded portion of the wrapping paper for advancing stepwise. If the folded portion of the wrapping paper is held, it is possible to transfer the wrapping paper more smoothly and apparatus is formed simply.

Further, in the alternative embodiment of the present invention, the wrapping paper guide means is formed of a plurality of wrapping paper guiding members arranged in plural levels, each being formed of a pair of right and left rod wires or plate members arranged horizontally parallel to each other such that a space between right and left rods decreases from the top to the bottom. Also, at the center of the guiding members, a receiving table is disposed parallel to the wrapping paper guiding members. In this structure, when the shell folded in half is supplied into the wrapping paper from the shell storing and delivery mechanism, the plain wrapping paper, which is guided between the wrapping paper guiding members and cut away for one taco, is folded into a V-shape together with the shell. Then, the shell and the wrapping paper fall down together in the wrapping paper guiding members to be received by the receiving table. Thereafter, the wrapping paper wrapping the shell is held by the wrapping paper transferring means to transfer stepwise.

In case the wrapping paper wound around a roll has a winding tendency, the distal end of wrapping paper cut by wrapping paper cutting means is rolled up, so that the distal end of the wrapping paper might not be adequately guided, and jamming of the wrapping paper might be caused. Therefore, in case a wrapping paper guide piece for introducing the distal end of the wrapping paper sent out by the wrapping paper supplying means is disposed in front of the moving blade of the wrapping paper cutting means, the rolled-up distal end of the wrapping paper is reformed by the wrapping paper guide piece to thereby prevent jamming of the wrapping paper.

BRIEF DESCRIPTION OF THE DRAWINGS

FIG. 5 shows a front view illustrating a further alternative embodiment of the automatic cooking apparatus according to the present invention;

FIGS. 6(a)–6(c) show a taco shell storing and delivery mechanism in FIG. 1, wherein FIG. 6(a) shows a front view, FIG. 6(b) shows a side view, and FIG. 6(c) shows a plan view thereof;

FIG. 7(a) and 7(b) show an alternative embodiment of the taco shell storing and delivery mechanism illustrated in FIG. 6, wherein FIG. 7(a) shows a front view, and FIG. 7(b) shows a plan view thereof;

DETAILED DESCRIPTION OF PREFERRED EMBODIMENTS

The present invention will be explained hereinafter with reference to the accompanied drawings of FIGS. 1 through 12.

Figure 1:
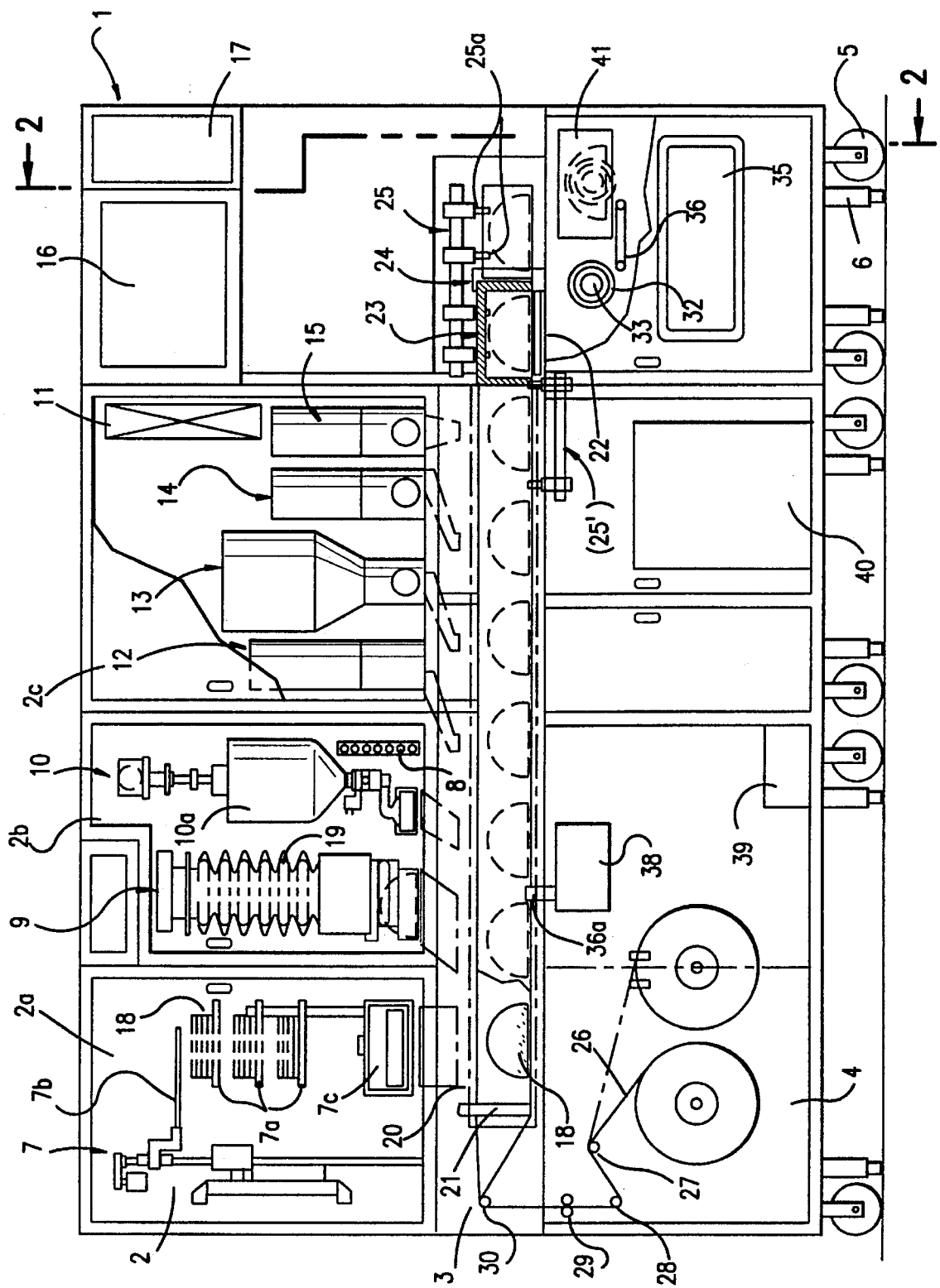
FIG. 1 shows a front view illustrating one embodiment of an automatic cooking apparatus according to the present invention.
Figure 2:
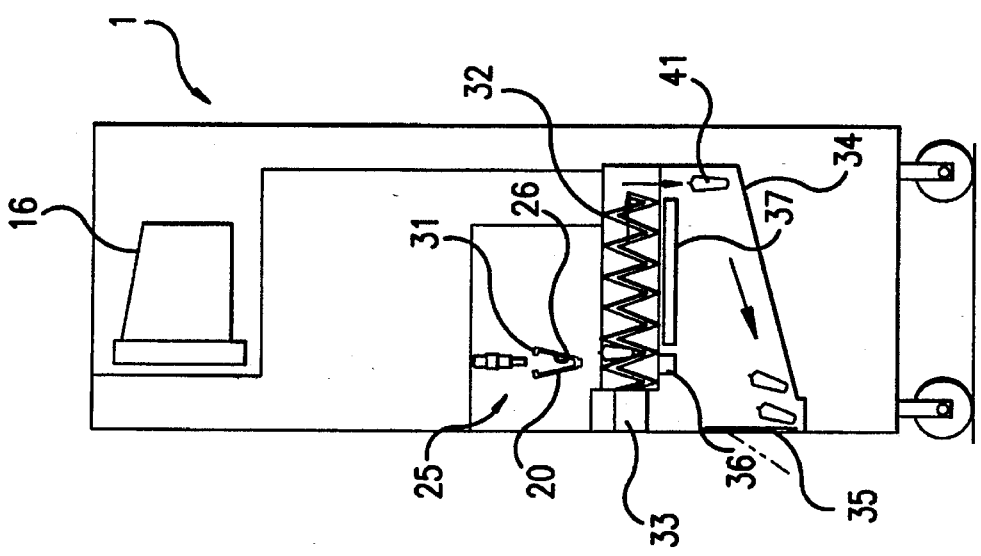
FIG. 2 shows a cross sectional view taken along line 2—2 in FIG. 1.

FIG. 1 shows a front view of an automatic cooking apparatus illustrating a first embodiment of the present invention, and FIG. 2 is a cross sectional view taken along line 2—2 in FIG. 1.

The automatic cooking apparatus is structured in a box shape steel cabinet 1, and the cabinet 1 is generally divided into a food material storage space 2 at an upper part, a cooking space 3 at an intermediate part, and a utility space 4 at a lower part. The food material storage space 2 and the utility space 4 are divided into several small rooms. Although a front portion of each room is closed with a door, the cooking space 3 communicates throughout a substantially whole length of the cabinet 1 and is opened at a front portion. The cabinet 1 is separated into three parts for convenience of carrying or disposing, and each part has casters 5. In an installed condition as shown in the figures, the cabinet 1 is slightly lifted up by jacks 6 to be positioned.

In the food material storage space 2, three rooms 2a, 2b, 2c are defined, and the rooms 2b and 2c are heat-insulated. A tortilla storing and delivery mechanism 7 is disposed in the room 2a at a room temperature, and a taco shell storing and delivery mechanism 9 and a ground beef storing and delivery mechanism 10 are arranged in the room 2b heated by a heater 8 at about 74 ° C. Further, in the room 2c cooled by a cooling device 11 at about 4 ° C., there are arranged a sour cream storing and delivery mechanism 12, a lettuce storing and delivery mechanism 13, a cheese storing and delivery mechanism 14 and a tomato storing and delivery mechanism 15. A right upper part of the cabinet adjacent to the room 2c is used as a control room. In the control room, there are arranged an operation display 16 with a touch panel at a front surface thereof, and a main control member 17.

The detail structures of the stuff storing and delivery mechanisms 7, 9, 10 and 12–15 are not illustrated in the figures, but substantial actuation principles of these mechanisms are explained as follows.

The tortilla storing and delivery mechanism 7 has three shelves 7a, and tortillas 18 used as shells for the tacos are piled up on the shelf 7a and stored. The tortilla 18 is prepared by baking a mixture of flour and liquid into a circular shape as described above, and has, for example, the diameter of about 180 mm and the thickness of 2 mm. In a transfer process of the tortilla 18, the tortilla 18 is adsorbed by a sucking disc arranged at a distal end of an arm 7b moved vertically and horizontally with a feed screw, so that the tortilla 18 is taken out one by one and inserted into a heating device 7c. The heating device 7c has a pair of upper and lower horizontal electro-thermal plates heated at all times, and the tortilla 18 inserted into the heating device 7c is sandwiched by the electro-thermal plates to be heated instantaneously. Thereafter, the heated tortilla 18 is pushed along its center line to be folded in half by a plate type pusher (not shown) moving vertically through a slit arranged at the center of the electro-thermal plates. The folded tortilla 18 is further pushed downwardly and falls in this posture through a chute.

A taco shell 19 is prepared by baking a cornmeal or the like mixed with liquid into a circular shape, and as mentioned above, further frying this baked shell folded in half to be hard. The taco shell 19 has, for example, the diameter of about 150 mm and the thickness of 1 mm. The taco shell storing and delivery mechanism 9 has a plurality of shelf plates horizontally supported by spiral wires to be transferred downward from the top. About ten sheets of the folded taco shells 19 are piled and laid down on each shelf such that the folded portions thereof face to the front.

Figure 6A:
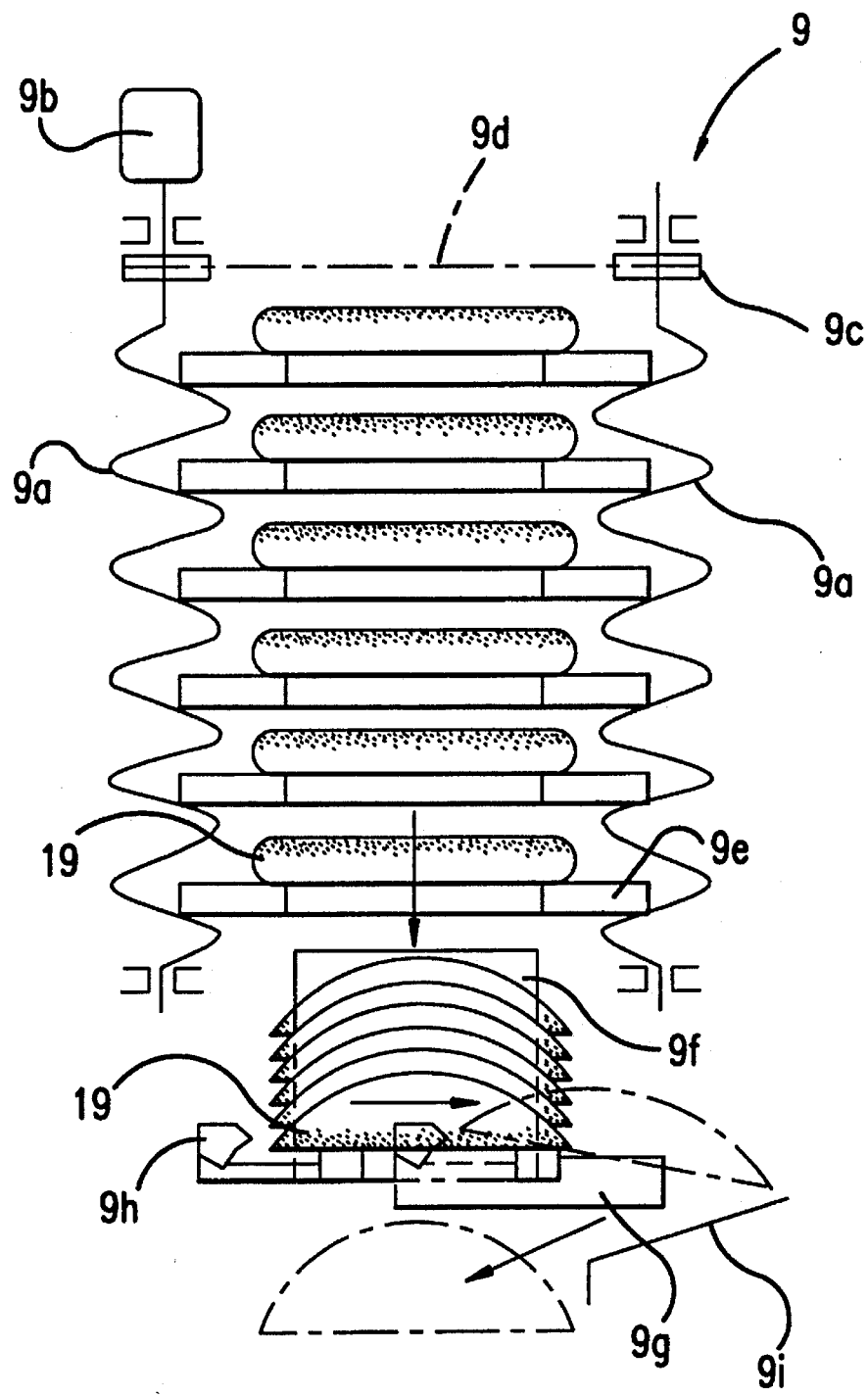
Figure 6B:
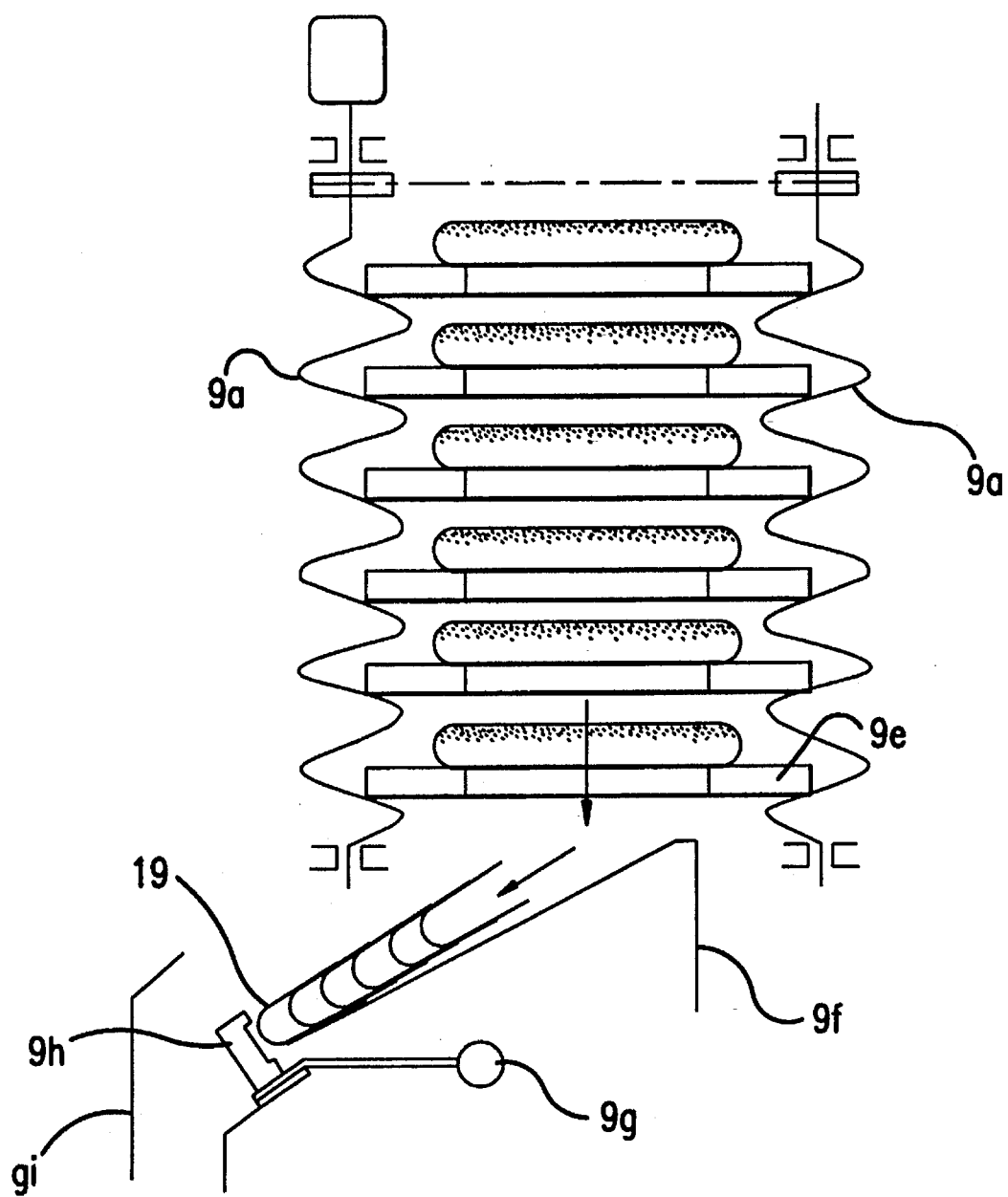
Figure 6C:
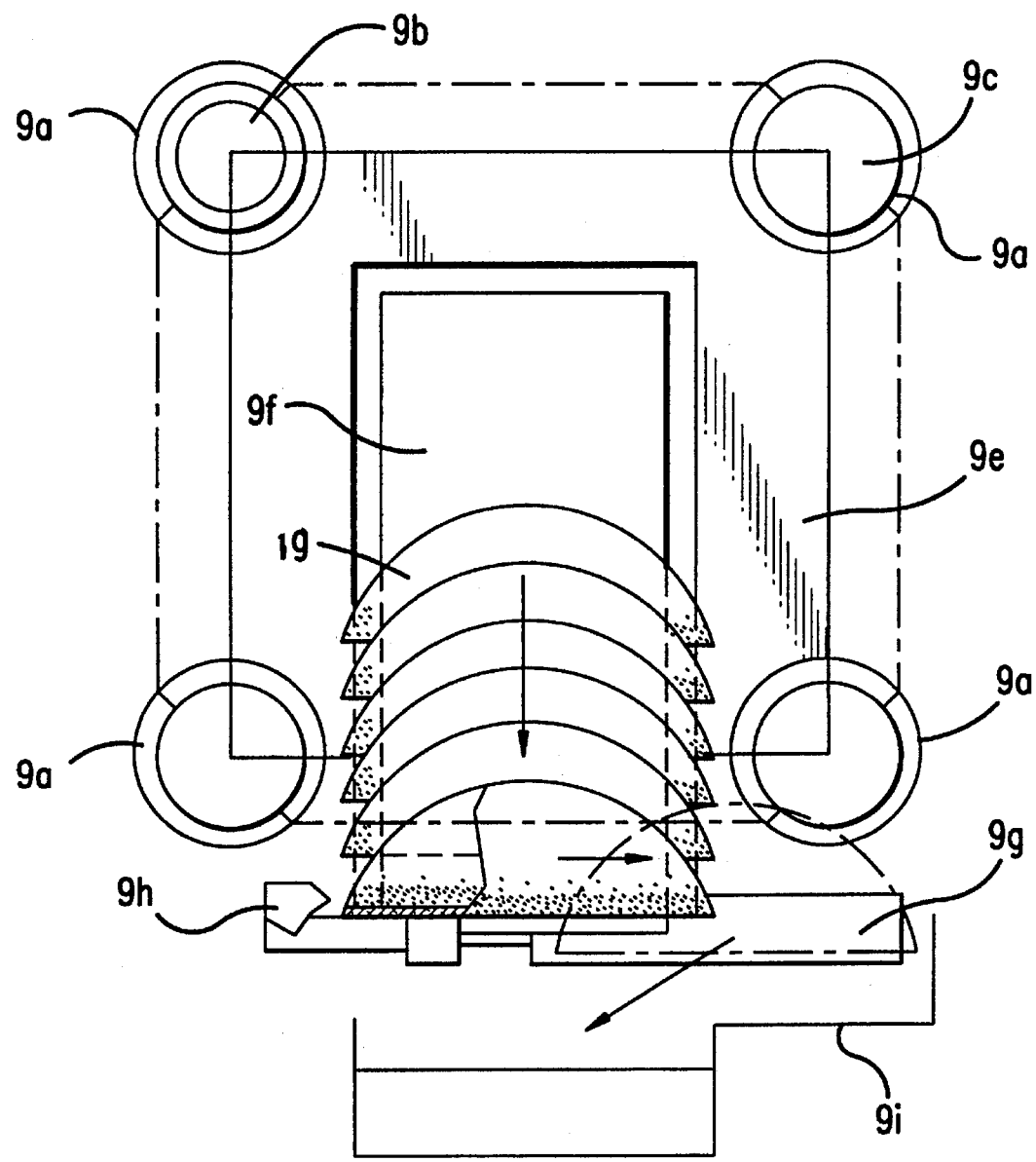

FIGS. 6(a)–6(c) show a substantial structure of the taco shell storing and delivery mechanism 9. FIG. 6(a) shows a front view, FIG. 6(b) is side view, and FIG. 6(c) is a plan view thereof.

As shown in FIGS. 6(a)–6(c), four spiral wires 9a are disposed vertically and driven to rotate at the same time by a common motor 9b through a chain 9d wound around sprockets 9c. Between the screw threads of the spiral wires 9a, four corners of a U-shaped shelf plate 9e having an open side at the front are placed so that the shelf plate 9e is supported by the spiral wires 9. On the shelf plate 9e, the taco shells 19 are piled up as mentioned above. Under the spiral wire 9a, there is provided a sloping table 9f sloping forward so as to face a group of the taco shells 19 on the shelf plates 9e. Further, a separation member 9h driven by an air cylinder 9g in the right and left directions is arranged at the front end of the sloping table.

In the aforementioned structure, when the taco shells 19 are supplied, the spiral wires 9a are driven for one rotation, so that the shelf plates 9e fall altogether for one pitch of the spiral wire 9a. Consequently, the lowest shelf plate 9e is separated from the spiral wires 9a and falls down to be caught in the recovery receptacle (not shown). Meantime, the group of the taco shells 19 falls down onto the sloping table 9f and received by the separation member 9h. Then, the separation member 9h is driven toward a right direction in the figure, and the front taco shell 19 of the group is separated from the group as shown by a chain line in FIG. 6(a), and falls down vertically and is guided to a chute 9i along an arrow in a position where a folded portion of the taco shell 19 faces downward. Thereafter, the separation member 9h returns to the original position to receive the rest of the group of the taco shells 19 and waits for the next feeding of the taco shell.

Figure 7A:
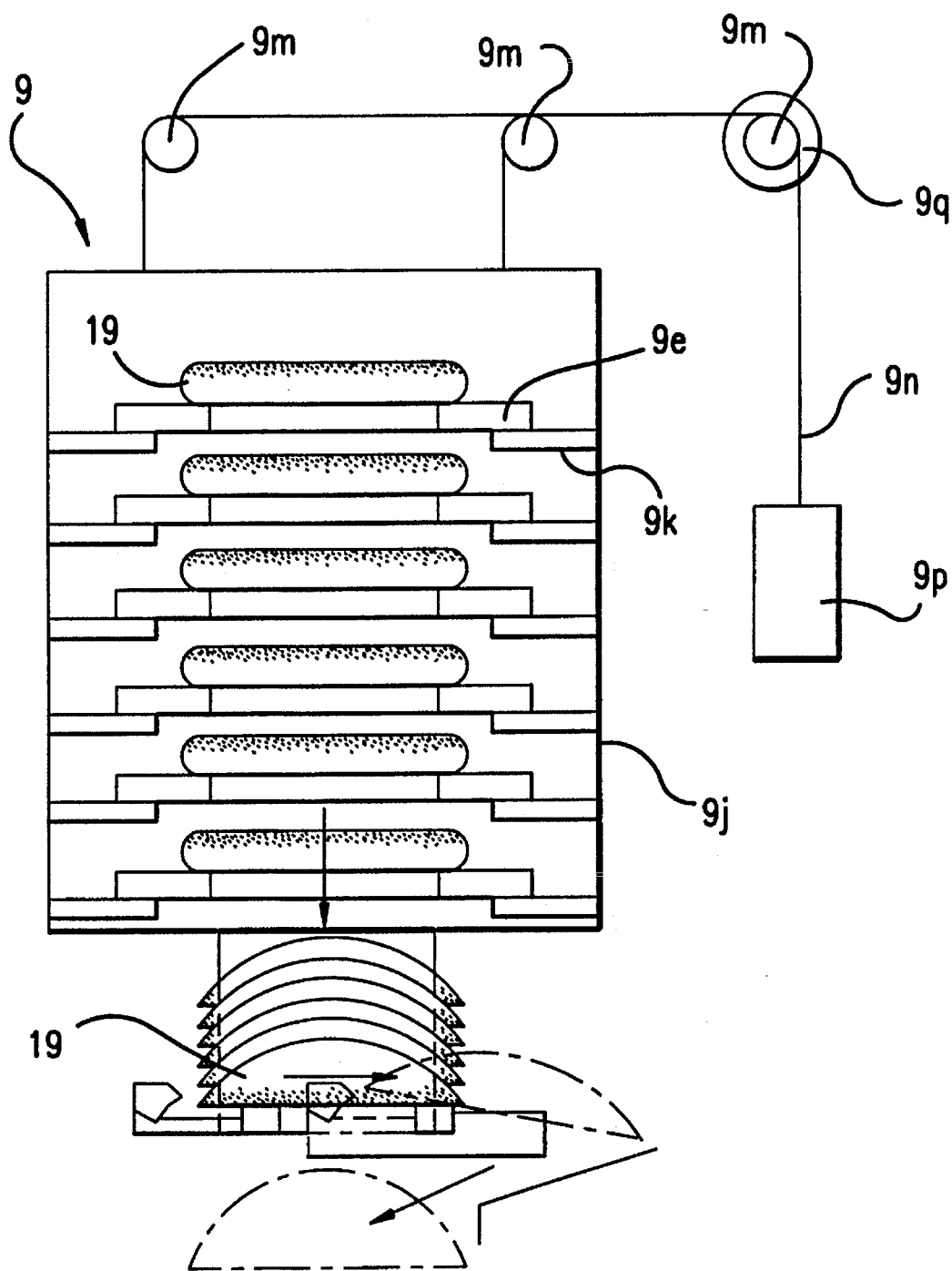
Figure 7B:
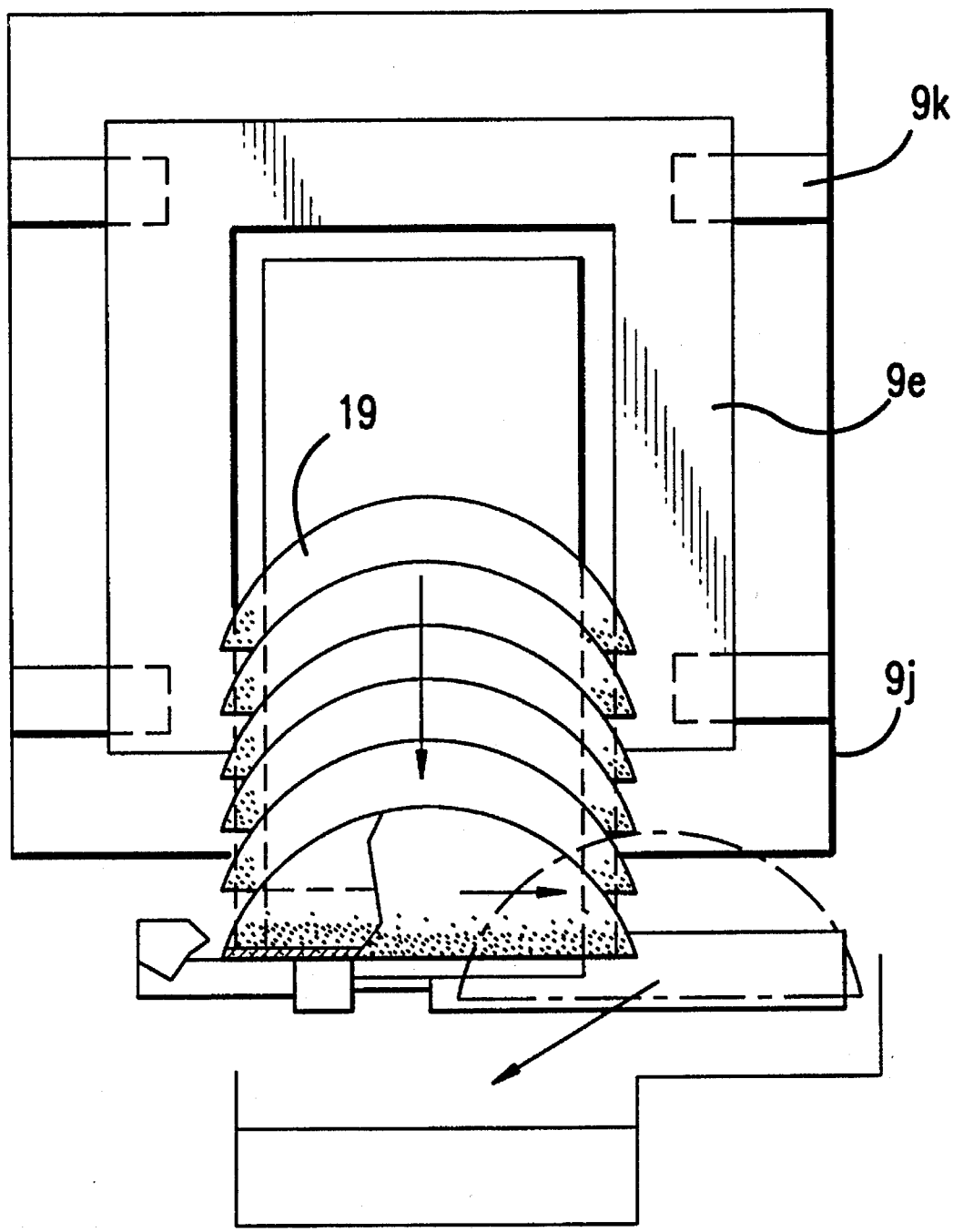

FIGS. 7(a) and 7(b) show an alternative embodiment of the taco shell storing and delivery mechanism 9, wherein FIG. 7(a) is a front view, and FIG. 7(b) is a plan view. In FIGS. 7(a) and 7(b), the shelf plates 9e are supported by claws 9k arranged in a box member 9j with an opening at a front side, and the box member 9j is suspended to be supported by a weight 9p connected to a wire 9n through pulleys 9m, and is moved vertically by a motor 9q. Other structures are the same as those in FIGS. 6(a)–6(c).

In the ground meat or beef storing and delivery mechanism 10, ground meat or beef cooked pasty is stored in a hopper 10a and always stirred by a stirring member 10b. The feeding of the ground beef is operated by a kind of piston pump. Namely, when a piston is driven backward by an air cylinder, a valve between the hopper 10a and a cylinder of the piston pump is opened so that the ground beef is supplied into the cylinder. Then, when the piston is driven forward, the aforementioned valve is closed and simultaneously a valve between the cylinder and an outlet is opened, so that the ground beef in the cylinder is pushed out from the outlet.

In the sour cream storing and delivery mechanism 12, yogurt-like sour cream is stored in a flexible tube. When the tube is squeezed by a roller driven by a motor, the sour cream is pushed out from an outlet. In the lettuce storing and delivery mechanism 13 and the cheese storing and delivery mechanism 14, shredded lettuces and cheese are stored respectively, and in the tomato storing and delivery mechanism 15, diced tomatoes are stored. In these mechanisms, screw mechanisms are respectively used for delivery. Namely, at the lower part of each food material tank, a screw is disposed horizontally in the front and rear directions. When the screw rotates by driving a motor, each food material is sent in an axial direction by means of a spiral fin of the screw and pushed out from each outlet.

In the front part of the cooking space 3, an elongated wrapping guide 20, which is made of stainless steel and has a V-shape in cross section, is arranged horizontally (FIG. 2). A rod 21 formed of a round rod with the diameter of 10 mm, which has a function to fold the wrapping paper in a V-shape as described later, is disposed vertically at a wrapping paper entrance in a left end of FIG. 1. A round distal end of the rod faces the bottom of the wrapping paper guide 20 in a space of about 0.1 mm. Also, so as to continue to a wrapping paper exit side of the wrapping paper guide 20, in the right end of FIG. 1, a flat receiving plate 22 is disposed at the same level as the bottom of the wrapping paper guide 20. And, in the upper side of the receiving plate, a wrapping paper sealing mechanism 23, which is shown as a gate-shaped pushing frame 23a, is disposed. Adjacent to the wrapping paper sealing mechanism 23, the wrapping paper cutting mechanism 24 is disposed as shown by a chain line in FIG. 1. At the upper side of the mechanisms 23 and 24, there is provided the wrapping paper transferring mechanism 25 driven by an air cylinder to move reciprocally in the lateral directions between a position shown by a chain line and a position shown by a solid line.

At the left end in the utility space 4 in FIG. 1, a roll of the tape-like wrapping paper 26 is rotatably supported. The wrapping paper 26 is, for example, a fine white paper having the width of 260 mm and the thickness of 45 μm, and a pressure sensitive type adhesive for adhering when pressed is spread all over the outer side of the roll. The wrapping paper 26 is firstly guided around two guide rollers 27 and 28, and while passing through feed rollers 29 driven by a motor, the paper 26 is turned around a guide roller 30 and is lead to a V-shape space of the wrapping paper guide 20. The wrapping paper 26 is plain until exiting from the guide roller 30, but after exiting from the guide roller 30, the wrapping paper is gradually changed into a V-shape along a center line of the wrapping paper. When entering into the wrapping paper guide 20, the wrapping paper is folded along a cross sectional shape of the wrapping paper guide 20, and advanced to a right end of the wrapping paper guide 20 through a space between the rod 21 and the bottom inner face of the wrapping paper guide 20. Furthermore, two rolls of the wrapping paper 26 are disposed side by side, so that when one of the rolls is run out, the other roll is immediately replaced.

Folding the wrapping paper 26 to change the shape thereof and introducing the wrapping paper 26 into the wrapping paper guide 20, as described above, are manually done when the apparatus starts to operate. Namely, when the wrapping paper 26 is guided to the guide roller 30, the distal end of the wrapping paper 26 is held between the operator's fingers to change the shape of the wrapping paper 26 into a V-shape. Then, the paper 26 is introduced into the wrapping paper guide 20 while passing under the rod 21, and is pulled to the right so that the distal end of the wrapping paper 26 overlaps the wrapping paper sealing mechanism 23. Meantime, the wrapping paper 26 is pressed by the distal end of the rod 21 along the center line of the wrapping paper to be folded into a V-shape and fitted in an inner wall of the wrapping paper guide 20 while advancing in the wrapping paper guide 20. Although right and left upper ends of the wrapping paper 26 are situated slightly lower than the wrapping paper guide 20, in order to prevent the wrapping paper 26 from protruding from the wrapping paper guide 20, U-shape caps 31 are attached to the right and left upper ends of the wrapping paper guide 20, as shown in FIG. 2.

In the right end part of the utility space 4, right and left spiral wires 32 are disposed horizontally to the front and rear directions, and each spiral wire is activated to rotate by a motor 33 (FIG. 2). As shown in FIG. 2, front sides of the spiral wires 32 are located under the wrapping paper guide 20, and rear sides of the spiral wires 32 are located above an upper part of a chute 34 sloping forward. The chute 34 communicates with a product delivery outlet 35 having a flap opening forwardly. Then, exactly under the wrapping paper guide 20, a narrow belt conveyer 36 is disposed adjacent to the lower surfaces of the spiral wires to extend horizontally to the right and left directions over the right and left spiral wires 32. Behind the belt conveyer 36, a receiving plate 37 is disposed horizontally to the front and rear directions adjacent to the lower surface of the spiral wire 32. The utility space 4 further receives a lower part sealing mechanism 38, a terminal control member 39, and a freezing unit 40 for providing freezing media to the cooling device 11, which are described later.

Explanation of the structures is finished hereupon, and explanation of the operation is described as follows. The apparatus is operated by touching a displayed picture in a display 15 so as to designate a food in a menu and the number of the food to be prepared. The food or order can be selected depending on whether the tortilla 18 is used (soft taco) or the taco shell 19 is used (hard taco), and depending on what combination of various stuffs is filled in. When the apparatus starts to operate, one sheet of the folded shell (the tortilla 18 or taco shell 19) is supplied into the inner side of the V-shape wrapping paper 26 located in the wrapping paper guide 20. Here, hypothetically, the tortilla 18 is supplied into the wrapping paper 26 for explanation. At the same time, the lower part sealing mechanism 38 and the wrapping paper sealing mechanism 23 seal the wrapping paper 26 in a predetermined way.

Namely, the lower part sealing mechanism 38 seals a folded portion of the wrapping paper 26 at the front and rear of the shell placed in the wrapping paper 26 (i.e., between the shells adjacent to each other), wherein a sealed portion has, for example, the height of 10 mm from the bottom of the folded portion and the width of 10 mm. Through a cutout portion (not shown) in the wrapping paper guide 20, clamps 38a press the fold portion of the wrapping paper 26 from the right and left sides to joint the facing sheet surfaces of the wrapping paper 26 thereat. As a result, there are provided partitions in the wrapping paper 26 at the front and rear of the shell, so that when a part of the stuffs supplied to the shell is dropped from the shell, the dropped stuff is prevented from entering into an adjacent shell area.

On the other hand, the wrapping paper sealing mechanism 23 seals a joint portion of the wrapping paper at the periphery of the completed taco after all the stuffs are supplied. Namely, the wrapping paper 26 projecting from the right side of the wrapping paper guide 20 in FIG. 1 and supported by the receiving plate 22 is pressed by a pair of right and left gate-shaped pushing frames 23a opened and closed by the air cylinder, so that the facing sheets of the wrapping paper 26 at the joint portion are connected in a gate-shape.

After the aforementioned sealing by the sealing mechanisms 23 and 38, the feed rollers 29 rotate for a predetermined time to send out a predetermined amount of the wrapping paper 26 from the roll. Meanwhile, the wrapping paper transferring mechanism 25 moves from the position shown by the solid line in FIG. 1 to the position shown by the chain line in FIG. 1, holds the upper end part of the sealed wrapping paper 26 by clamps 25a to move back to the position shown by the solid line, and separates the upper end. Therefore, the wrapping paper 26 in the wrapping paper guide 20 is advanced stepwise for a predetermined stroke, for example, 230 mm. After the movement of the wrapping paper 26 is finished, the wrapping paper cutting mechanism 24 is activated to cut the wrapping paper 26 for the length of the aforementioned stroke. After starting operation of the apparatus, the wrapping paper 26 is sealed and cut without any taco until the first completed taco reaches the wrapping paper sealing mechanism 23. The wrapping paper cutting mechanism 24 has a pair of moving blades perpendicular to both sides of the wrapping paper 26, so that when the cutting mechanism is operated, these blades approach toward each other to cut the wrapping paper 26.

While the wrapping paper 26 is being cut, the predetermined amount of the ground beef is supplied from the ground beef storing and delivery mechanism 10 into the inner side of the tortilla 18 placed in the wrapping paper 26. For the hard taco, immediately after the taco shell 19 is fed, the ground beef is supplied into the taco shell as a next step. However, for the soft taco, the ground beef is supplied at two steps after the tortilla 18 is fed. Such an empty step is formed when the staffs are selectively supplied, and the operation is controlled based on menu data inputted in advance. After the supply step is finished, the wrapping paper transferring mechanism 25 advances the wrapping paper 26 for one step, and immediately after the wrapping paper is advanced, the wrapping paper 26 is sealed by the wrapping paper sealing mechanisms 23. Then, the distal end of the wrapping paper 26 is cut by the wrapping paper cutting mechanism 24.

Meanwhile, a predetermined amount of the sour cream is supplied from the sour cream storing and delivery mechanism 12 into the tortilla 18 in the wrapping paper 26, and a next tortilla 18 is provided from the tortilla storing and delivery mechanism 7 into the wrapping paper 26. By repeating these processes, the tortillas 18 are supplied one by one from the tortilla storing and delivery mechanism 7, and the necessary stuffs depending on the menu are supplied into these tortillas 18 from each of the stuff storing and delivery mechanisms 9, 10 and 12 through 14, in order. After the stuffs are supplied, the taco reaches the wrapping paper sealing mechanism 23 to be sealed. Sequentially, the partition between one taco and next taco is cut by the wrapping paper cutting mechanism 24, so that a product 41, i.e. the taco covered by the V-shape wrapping paper cut into the length of 230 mm and sealed in the gate-shape at the periphery of the taco, is completed.

When the wrapping paper 26 is cut, the product 41 falls down and is received by the belt conveyer 36. When perceiving the product 41 by means of a sensor (not shown), the belt conveyer 36 distinguishes between the hard taco and the soft taco by the menu data or order inputted preliminary, and rotates toward right or left to send the product to either the right or left spiral wire 32. In case the product 41 is the soft taco and is sent to the right spiral wire 32, the spiral wire 32 rotating continuously transfers the product 41 toward the back of the apparatus as shown by an arrow in FIG. 2, so that the product 41 is dropped down on the chute 34 from the back end of the spiral wire 32. As shown in FIG. 2, the product 41 slides down on the chute 34 to reach to the product delivery outlet 35, and is taken out and handed to the customer. In case the product 41 is the hard taco, the operating movement is the same as in the case of the soft taco, except that the taco shell 19 is firstly supplied instead of the tortilla, and is transferred to the left spiral wire 32 for delivery.

In FIG. 1, the wrapping paper transferring mechanism 25 is arranged to hold the upper end of the wrapping paper 26 after sealed. However, as shown by the chain line in FIG. 1, when the wrapping paper transferring mechanism 25' is disposed under the wrapping paper guide 20 to hold the folded portion of the wrapping paper 26 and to advance the wrapping paper 26 consecutively, the wrapping paper 26 can be transferred further smoothly. In this case, a cutout or hole for escaping the reciprocal movement of the clamp 25a is formed at the wrapping paper guide 20.

In the automatic cooking apparatus for the tacos as described above, since the shell and the stuffs are supplied as the wrapping paper is advanced stepwise or consecutively and the products are continuously sent from the final stage of the process, the product efficiency is excellent and the tacos are produced at high speed, i.e., one taco in four seconds. Also, the amount of the stuffs to be supplied is accurately fixed.

Further, the staffs are supplied into the shell in the wrapping paper, so that dropped stuffs remain in the wrapping paper and are not scattered in the working space. Furthermore, since the stuffs are not directly touched by one's hands, it is hygienic.

In the aforementioned embodiment, the wrapping paper is cut away at the final stage of the process after the wrapping of the taco is completed. In this structure, it is easy to transfer the wrapping paper since the wrapping paper continues until the final stage of the process. On the other hand, in this structure, when the apparatus starts to operate or the production of the taco is interrupted, a part of the tape-like wrapping paper is not used.

Figure 4:
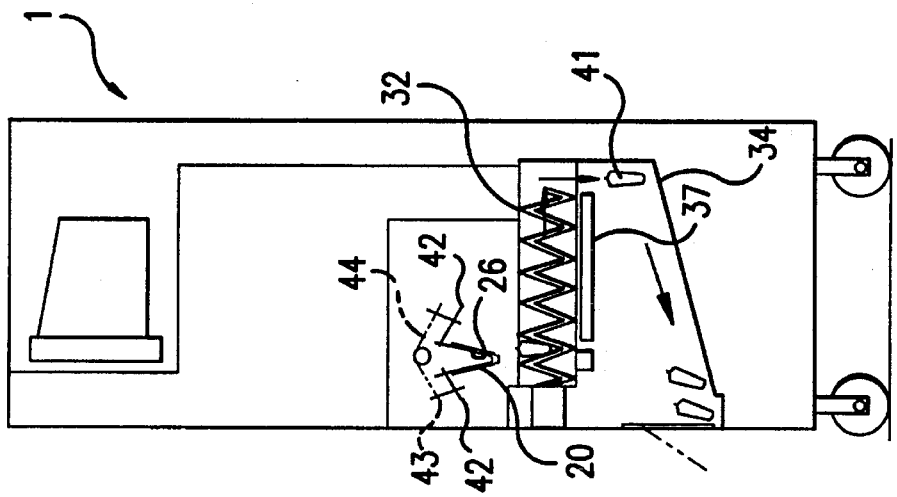
FIG. 4 shows a cross sectional view taken along line 4—4 in FIG. 3.
Figure 3:
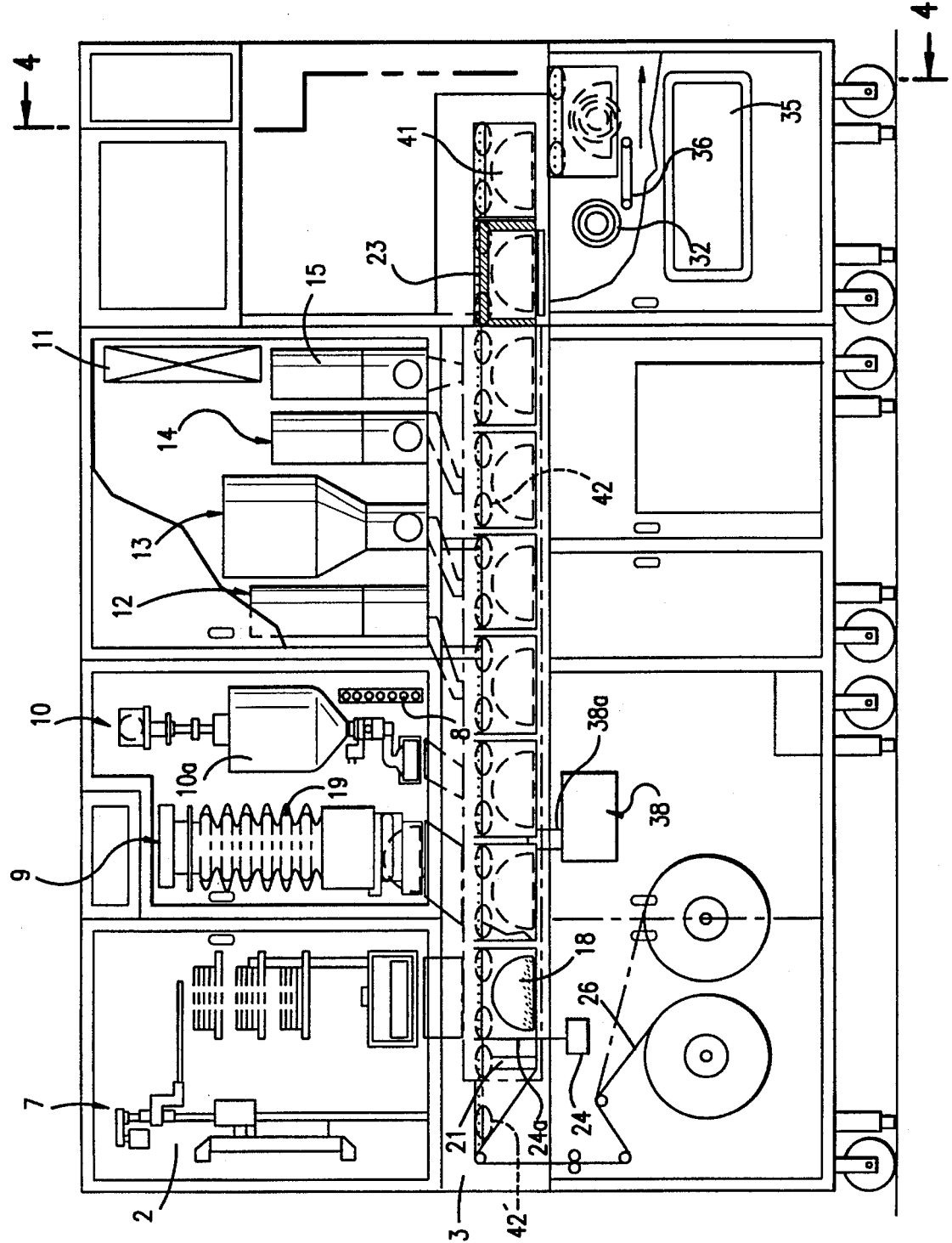
FIG. 3 shows a front view illustrating another embodiment of the automatic cooking apparatus according to the present invention.

Therefore, an alternative embodiment having a structure of preventing wasting of the wrapping paper, wherein the wrapping paper is cut when the wrapping paper is introduced into the wrapping paper guide, is illustrated in FIG. 3 (a front view) and FIG. 4 (a cross sectional view taken along line 4—4 in FIG. 3). In the embodiment of FIG. 3, the wrapping paper cutting mechanism 24 is disposed at the end of a wrapping paper entrance (left end) of the wrapping paper guide 20, and the wrapping paper 26 introduced into the wrapping paper guide 20 is cut immediately after it is pressed by the rod 21. The wrapping paper guide 20 has adequate spaces at the front and rear portions where a cutter 24a is operated.

Further, in this embodiment, a feed space having the width of about 10 mm is formed at both sides of the wrapping paper 26 so as to protrude from the upper end of the wrapping paper guide 20. In the feed space, feed holes each having, for example, the diameter of 4 mm, are formed one after another in a pitch of 12.5 mm. By means of the wrapping paper transferring mechanism formed of a large number of feed sprockets 42 disposed in right and left sides to engage the feed holes, the wrapping paper 26 is advanced stepwise in a predetermined pitch as if it were a film in a camera. Each sprocket 42 (not illustrated in detail in the figures) is connected endlessly by a chain 44 engaging sprockets 43 for driving, each sprocket 43 being disposed at the end of the sprocket 42. When one of the sprockets 42 is driven by a motor, other sprockets are driven simultaneously. However, the sprocket 42' for transferring the wrapping paper 26 from the roll and the sprocket 42 for consecutively advancing the cut wrapping paper 26 are driven separately since they have different pitches as described later.

In this structure, when the apparatus starts to operate, the distal end of the wrapping paper 26 is set into the wrapping paper guide 20 to be positioned, for example, 230 mm away from the cutter 24a. When the apparatus starts to operate, the tortilla 18 is supplied from the tortilla storing and delivery mechanism 7 into the wrapping paper 26, and sequentially, the wrapping paper cutting mechanism 24 is activated to cut the wrapping paper 26 into the aforementioned length of 230 mm for one taco. In the case of the hard taco, after advancing the one step, the taco shell is supplied.

Then, the wrapping paper transferring mechanism advances the cut wrapping paper 26 stepwise, in this case, in a pitch of 240 mm, and at the same time transfers the wrapping paper 26 from the roll for a length of 230 mm. Thus, there is a space of 10 mm between a proximal end of the wrapping paper 26 cut first and a distal end of the wrapping paper sent out next. The reason why such a space of 10 mm is arranged between the sheets of the cut wrapping paper 26 is to avoid a danger that when the adjacent sheets of the wrapping paper 26 overlap by a feeding error and are sealed by the wrapping paper sealing mechanism 23 later in such a condition, the products 41 would be connected together.

Thereafter, step by step, a new shell is supplied, and the stuffs are supplied into the shells in order, and finally the wrapping paper is sealed by the wrapping paper sealing mechanism 23. When the sealed product 41 is further sent for one pitch, the product 41 loses a support of the receiving plate 22 and is disengaged from the sprockets 42 to thereby fall down on the belt conveyer 36. The operation thereafter is the same as in the embodiment of FIG. 1. In the embodiment described here, it is easy to set the wrapping paper 26 when the apparatus starts to operate, and a part of the wrapping paper 26 is not wasted since the cut wrapping paper 26 is all used for wrapping even at the start of operating the apparatus and even in the interruption of the production.

In the embodiment shown in FIGS. 3 and 4, as means for sending or transferring the wrapping paper 26, a double roller or a double belt can be used instead of the sprockets 42. Namely, a plurality of rollers paired to nip the feed space of the wrapping paper 26 is disposed in the right and left sides, or a pair of the endless belts is disposed in the right and left sides, so that these rollers or belts are rotated to send the wrapping paper 26. In this case, only one of the rollers or belts, which is disposed either of the inner and outer sides of the wrapping paper 26, may be driven, and the other roller or belt may be simply pressed. Driving a large number of the rollers can be made by driving a chain altogether as in the sprockets, and the belt can be driven by rotating one of the belt wheels.

FIG. 5 is a front view of a further alternative embodiment. In FIG. 5, the wrapping paper 26 sent out from the roll by the guide roller 27 and the feed roller 29 is introduced into the wrapping paper guide 20 while keeping a plain shape, and at the entrance of the wrapping paper guide 20, the wrapping paper 26 is cut for one food item by the wrapping paper cutting mechanism 24. Here, in the wrapping paper guide 20, as shown in the enlarged cross sectional view in FIG. 10, the wrapping paper guide 20 is formed of parallel pairs of right and left stainless steel wire rods 45 through 49. The wire rods 45 through 49 are horizontally disposed between the wrapping paper cutting mechanism 24 and the wrapping paper sealing mechanism 23. The space between the right and left rods of each pair decreases from the top to the bottom, in three levels in FIG. 10. Namely, a first level is formed of the rods 45, 48, a second level is formed of the rods 46, 49 and a third level is formed of the rod 47. Also, at the center area under the guide 20, a receiving table 50 formed of a stainless steel plate is disposed parallel to the wrapping paper guide 20.

The rods 45 through 49 are supported by support pillars 52 formed at a predetermined interval through supporting wire rod 51 disposed perpendicular to the longitudinal direction. FIG. 5 shows only the wire rods 45 and 46 as the wrapping paper guide 20. Also, left end side of the wire rods 45 and 46 is cut for facilitating assembly and checkup.

Figure 9:
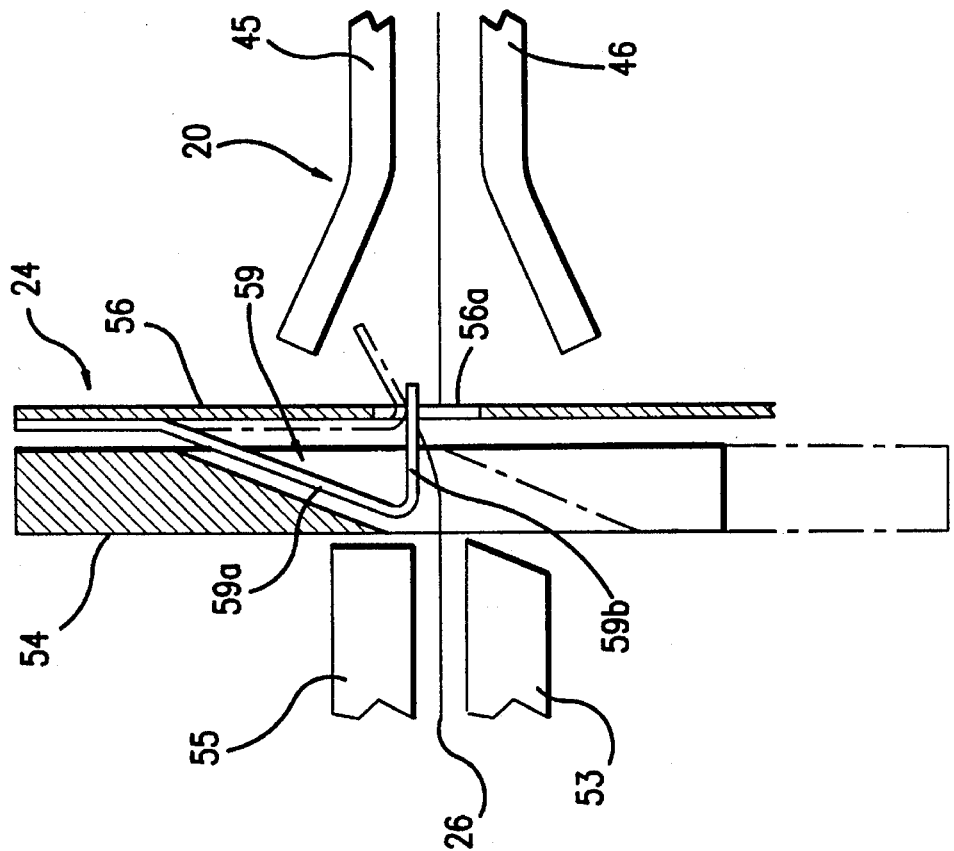
FIG. 9 shows an enlarged view of a main part in FIG. 8.
Figure 8:
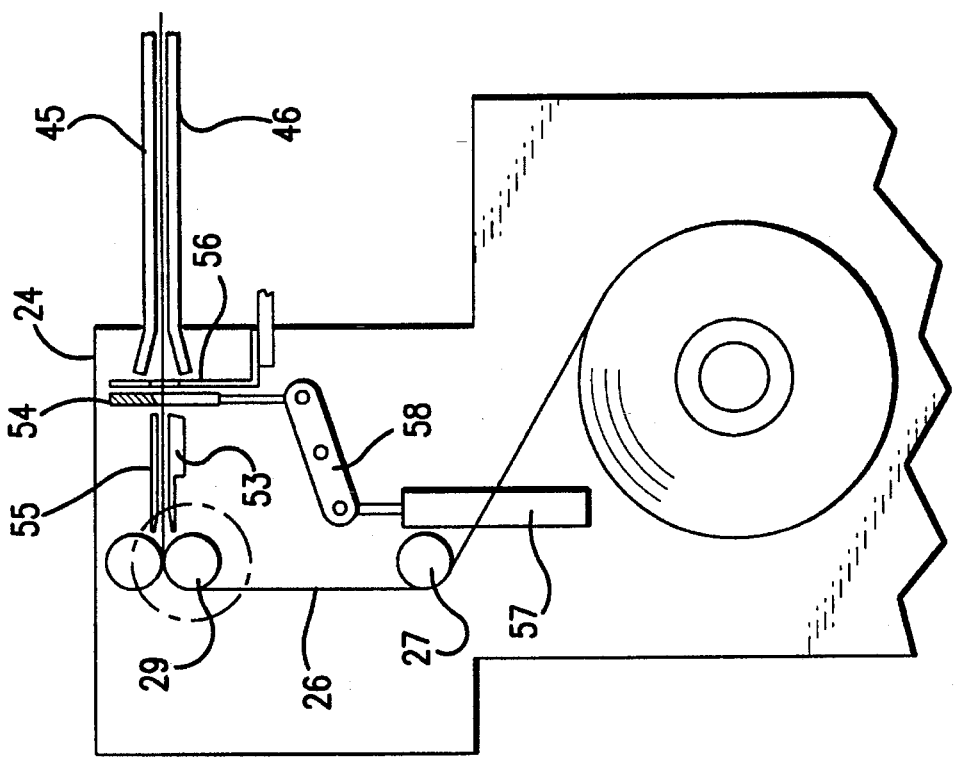
FIG. 8 shows a longitudinal section view of a wrapping paper cutting mechanism in FIG. 5.

FIGS. 8 and 9 show enlarged views of the wrapping paper cutting mechanism 24, wherein FIG. 8 is a longitudinal cross sectional view and FIG. 9 is an enlarged view of a main part of FIG. 8. In the figures, the wrapping paper cutting mechanism 24 has a stationary blade 53 disposed horizontally and a moving blade 54 moving perpendicularly to the stationary blade 53, and a guide plate 55 is disposed above the stationary blade 53 through a space for introducing the wrapping paper 26. In front of the moving blade 54, a cover plate 56 is disposed to cover the front of the moving blade 54, and a hole 56a for passing the wrapping paper 26 therethrough is bored in the cover plate 56. The moving blade 54 is driven by an air cylinder 57 through a link 58, and when the moving blade 54 is pulled down from the position illustrated in FIG. 9, the wrapping paper 26 is cut between the stationary blade 53 and the pulled moving blade 54.

Incidentally, since the wrapping paper 26 sent out from the roll has a tendency to wind, the distal end of the wrapping paper 26 tends to roll up as shown in FIG. 9. Therefore, when the cut end of the wrapping paper 26 is introduced into the wrapping paper guide 20, there is a possibility that the wrapping paper 26 is blocked by the cover plate 56 or the wrapping paper guiding members of the wrapping paper guide 20 to cause a paper jam.

Therefore, in FIG. 9, wrapping paper introducing pieces 59 formed of a plate spring are attached to the cover plate 56. The wrapping paper introducing piece 59 is formed of a sloping part 59a extending along a cutting edge of a front face of the moving blade 54 and a horizontal part 59b protruding from the sloping part 59a. The wrapping paper introducing pieces are disposed in both right and left ends of the moving blade 54 so as to hold both sides of the wrapping paper 26. By means of the wrapping paper introducing pieces 59, the distal end of the wrapping paper 26 cut between the stationary blade 53 and the moving blade 54 is pressed at the rolled-up part thereof by the horizontal part 59b as illustrated in FIG. 9, and is smoothly advanced into the wrapping paper guide 20. When the moving blade 54 descends, the sloping part 59a is pushed by the cutting edge and is elastically deformed to move or escape forwardly as shown by a chain line in FIG. 9. Alternatively, the wrapping paper introducing piece may be formed in a shape of a block by resin instead of the plate spring, which can slide by a spring separately formed in the front and rear directions while being pressed to the sloping part of the moving blade.

In FIG. 5, again, each stuff storing and delivery mechanism disposed in the stuff storage space 2 of the cabinet 1 is substantially the same as in the embodiment of FIG. 1, and before the apparatus starts to operate, the wrapping paper 26 is set such that the distal end of the wrapping paper 26 is introduced into the wrapping paper guide 20 in a length for one taco, i.e. 230 mm. In this stage, the wrapping paper 26 is advanced into a space between the wire rods 45, 48 and the wire rods 46, 49, which are used as the wrapping paper guiding members, and as shown by a chain line in FIG. 10, the wrapping paper 26 is flat immediately after it is introduced.

Thereafter, when the apparatus starts to operate, first of all, the wrapping paper cutting mechanism 24 cuts the wrapping paper 26. Then, the tortilla storing and delivery mechanism 7 (FIG. 1) provides the tortilla 18 in a condition folded in half, wherein the tortilla 18, as described in the embodiment of FIG. 1, is pushed along the center line thereof by the plate pusher to be folded in half when pushed out from the electro-thermal plate. At this stage, in the embodiment of FIG. 1, the falling stroke of the pusher is just enough to push down the tortilla 18 from the electro-thermal plate. However, in the embodiment of FIG. 5, the stroke is further prolonged so that a distal end of the pusher 60 can reach the bottom of the wrapping paper guide 20, i.e., the vicinity of the upper side of the receiving table 50.

Figure 10:
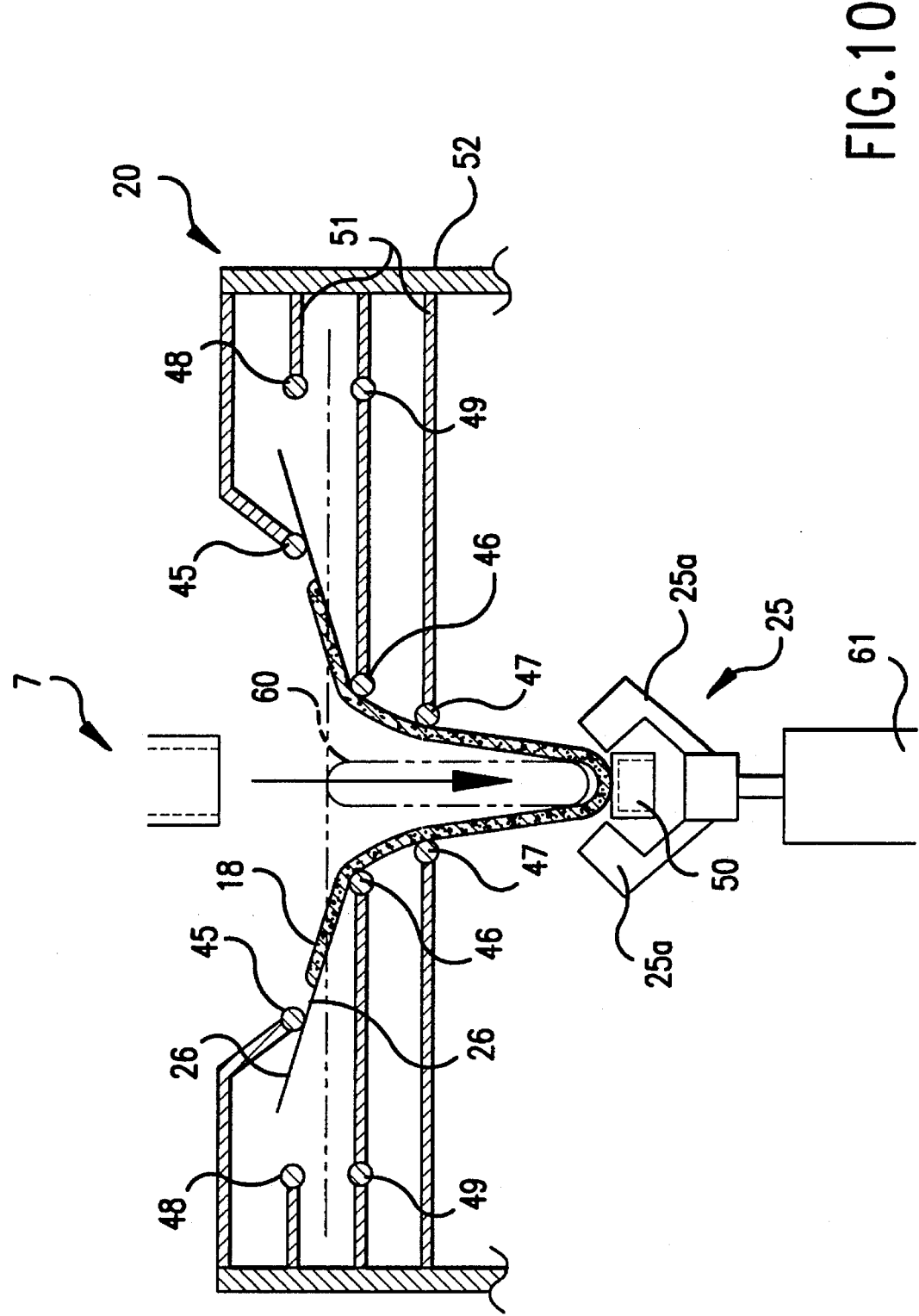
FIG. 10 shows a lateral section view of one embodiment of a wrapping paper guide in FIG. 5.

Namely, in FIG. 10, the pusher 60 advanced toward a direction shown by an arrow folds the tortilla 18 in half and pushes it down into the wrapping paper 26 from the tortilla storing and delivery mechanism 7, and further pushes down the tortilla 18 and the wrapping paper 26 as shown in the figure. Consequently, the tortilla 18 and the wrapping paper 26 are folded into a V-shape along a cross section formed of the wire rods 46 and 47 of the wrapping paper guide 20 and the receiving table 50. In this condition, the wire rods 45 prevent both edges of the wrapping paper 26 from moving up.

On the other hand, when the taco shell 19 already folded over (referring to FIG. 6) is supplied, the tortilla 18 is not fed, but the pusher 60 descends so that only the wrapping paper 26 is folded into the V-shape in the wrapping paper guide 20. After the tortilla 18 is supplied into or only the wrapping paper 26 is folded as described above, the wrapping paper transferring mechanism 25 holds the folded portion of the wrapping paper 26 and advances consecutively the wrapping paper 26, also in this case, for the length of 240 mm. At the same time, the feed roller 29 sends out 230 mm of the next wrapping paper 26 into the wrapping paper guide 20. Thus, also in this case, a space of 10 mm is established between the distal end of the newly sent wrapping paper 26 and the proximal end of the wrapping paper 26 cut before.

Here, the wrapping paper transferring mechanism 25 in this embodiment has a large number of clamps 25a (10 pieces of clamps in FIG. 5) for holding the folded portions of all the cut-away sheets of the wrapping paper 26 situated on the wrapping paper guide 20 and the receiving plate 22 so as to step-advance all of the cut-away sheets simultaneously. Each clamp 25a is arranged to hold the adjacent sheets of the wrapping paper 26 together by extending over the aforementioned space of 10 mm, and is opened and closed in the right and left directions by operation of an air cylinder 61 as shown in FIG. 10.

Ten pieces of the clamp 25a as shown in FIG. 5 are divided into two groups, a group of seven pieces and a group of three pieces, for the reason of assembly. The group of seven pieces is driven by an air cylinder 62 and the group of three pieces is driven by an air cylinder 63. The wrapping paper transferring mechanism 25 of FIG. 5 for holding the front and rear ends of the cut sheets of the wrapping paper 26 also has a function as in the lower part sealing mechanism 38 of the embodiment in FIG. 1 or FIG. 3. Namely, each sheet of the wrapping paper 26 is held by the clamps 25a at the folded portions of the wrapping paper 26, so that the parts held by the clamp 25a are pressed to joint together. Further, since the clamps 25a repeatedly hold the wrapping paper 26 whenever the apparatus is advanced stepwise, sealing operation is made securely.

This embodiment is the same as the embodiment of FIG. 1 or FIG. 3 in that whenever the wrapping paper 26 is advanced stepwise, the wrapping paper 26 is newly sent out, the shell is supplied one after one, and various stuffs are supplied into the shell. And, at the final stage of the process on the receiving plate 22, the joint portion of the wrapping paper 26 at the periphery of the taco is sealed by the wrapping paper sealing mechanism 23 in the shape of the gate. The product 41 completed as described above is sent to the transferring table 65 directly connected to an air cylinder 64 moving up and down. When the transferring table 65 receives the product 41, the air cylinder 64 lifts the table vertically. Then, a transferring mechanism 66 disposed right above the transferring table 65 holds the product 41 by clamps 66a. And without changing the position in case the product 41 is a soft taco, or after changing the position to the left in case the product 41 is a hard taco, the transferring mechanism 66 advances toward the back of the cabinet 1 and drops down the product 41 on a chute 67. The product 41 sliding down on the chute 67 is received by one of two right and left spiral wires 68 disposed in front and rear directions. Whenever the spiral wire 68 receives the product 41, the spiral wire 68 makes one rotation to send the product 41 for one pitch toward back and stops. As described above, in the two spiral wires 68, the products 41 are divided into the soft tacos and the hard tacos to be stored, and are soon taken out and handed to the customers.

Figure 11:
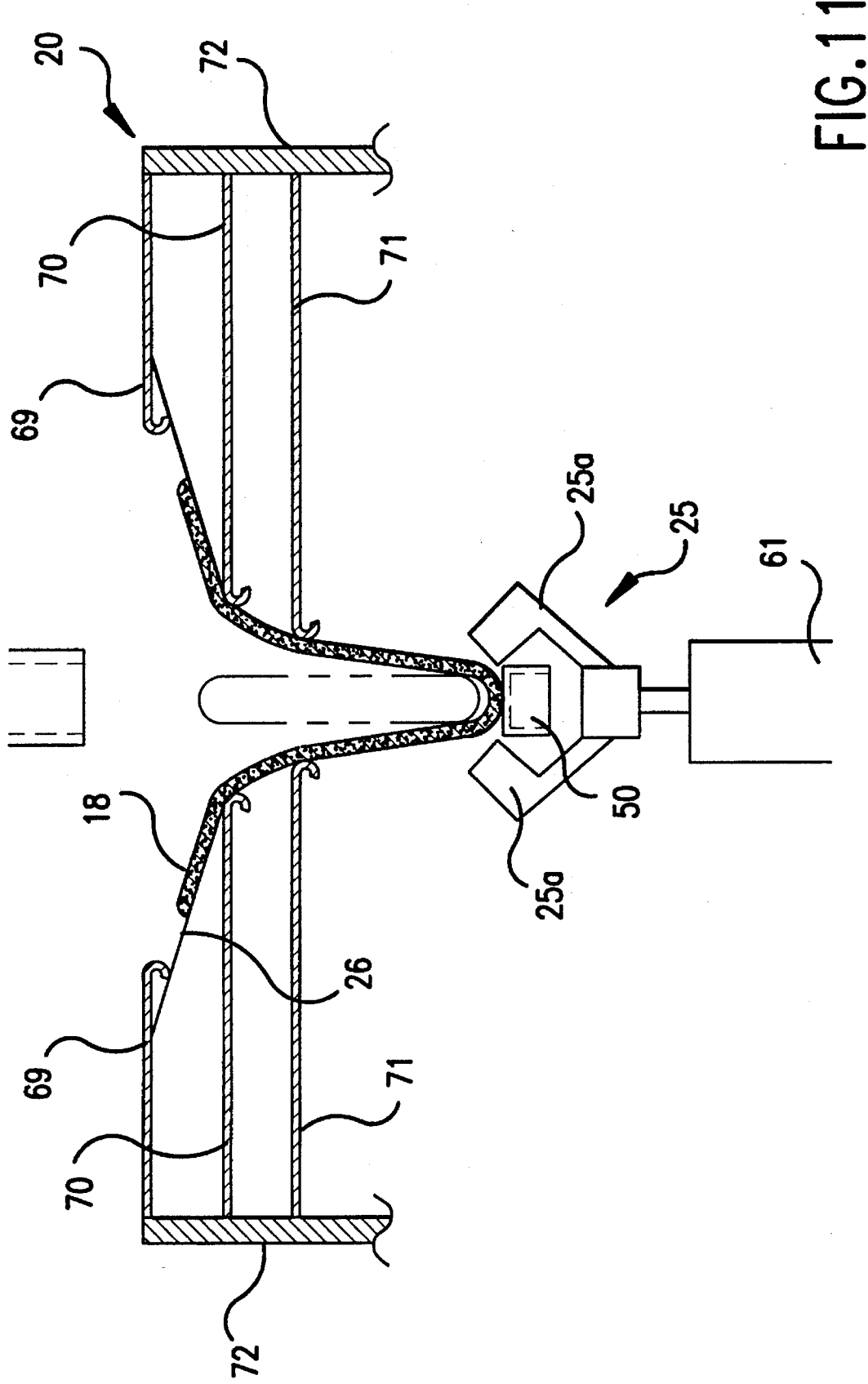
FIG. 11 shows a lateral section view of an alternative embodiment of the wrapping paper guide in FIG. 10.
Figure 12:
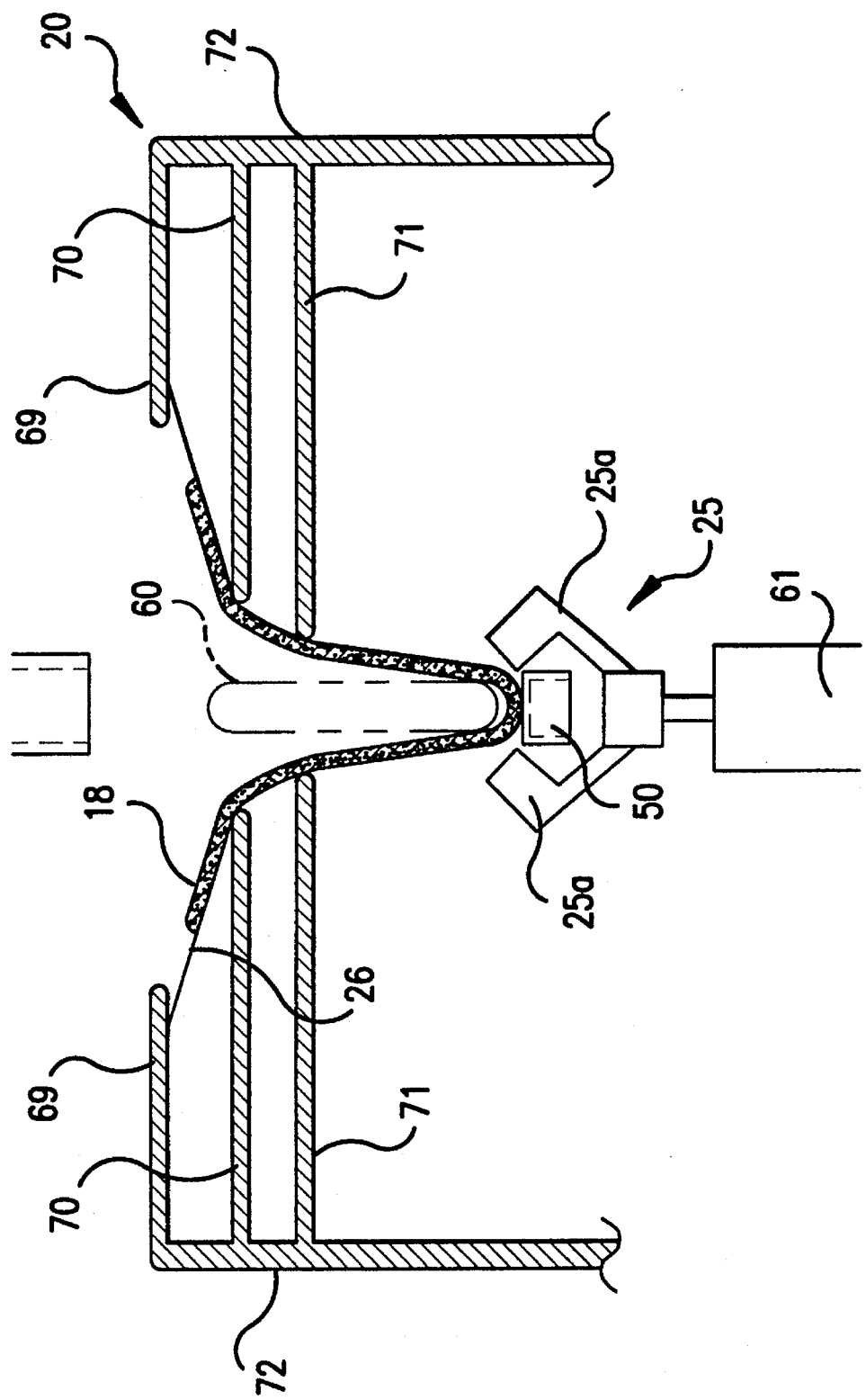
FIG. 12 shows a lateral section view of a further alternative embodiment of the wrapping paper guide in FIG. 10.

FIGS. 11 and 12 show alternative embodiments of the wrapping paper guide 20. FIG. 11 shows an embodiment having wrapping paper guiding members formed of plate members instead of the wire rods. In this embodiment, the wrapping paper guiding members are formed of pairs of right and left stainless steel plate members 69 through 71 which have curled ends and are situated parallel to each other. The guiding members are disposed horizontally in three levels in the embodiment of FIG. 11 so that the respective spaces, each being sandwiched between the right and left plate members for forming the pair, decrease from the top to the bottom. At the center of the area under the guiding members, the receiving table 50 formed of a stainless steel plate is arranged parallel to the wrapping paper guiding members. Each of the plate members 69 through 71 is supported by a support pillar 72. FIG. 12 shows an embodiment in which all of the plate members 69 through 71 and the support pillars 72 are integrally formed of resin.

According to the present invention, it is possible to automatically prepare the tacos which were prepared manually, and the following effects can be obtained.

(1) Since the product is provided speedy with a fewer labor, waiting time for the products by the customers can be reduced and labor cost can be saved at the same time.

(2) It is possible to provide the product of substantially the equal quality, wherein the amount of the stuffs supplied is fixed.

(3) Since the food item is not directly touched by hands and the stuffs are not scattered in the working space, it is hygienic.

Furthermore, the present invention can be applied to preparation of food items, other than the taco, similar to taco, i.e. a food item prepared by putting several stuffs into a shell folded in half.

What is claimed is:

1. An automatic cooking apparatus, comprising:

wrapping paper supply means for supplying an elongated wrapping paper, wrapping paper folding means situated adjacent to the supply means, said folding means folding the wrapping paper along a center line thereof into a V-shape, wrapping paper guide means situated adjacent to the folding means and having a wrapping paper entry side and a wrapping paper exit side, said guide means guiding and holding the wrapping paper folded into the V-shape, wrapping paper transferring means situated adjacent to the guide means, said transferring means consecutively transferring the wrapping paper situated in the guide means in a predetermined pitch, shell storing and delivery means disposed above the guide means at the wrapping paper entry side thereof, said storing and delivery means being adapted to supply a shell folded in half one by one into the wrapping paper whenever the wrapping paper is advanced stepwise, a plurality of stuff storing and delivery means disposed above the guide means and from a portion adjacent to the shell storing and delivery means in a row toward the wrapping paper exit side, said storing and delivery means supplying a predetermined amount of stuffs into the shell in order whenever the wrapping paper is advanced stepwise to thereby complete a food item, first wrapping paper sealing means situated adjacent to the stuff storing and delivery means, said first sealing means jointing a periphery of the wrapping paper outside the food item, wrapping paper cutting means for cutting the wrapping paper, said cutting means being situated adjacent to a portion selected from the group consisting of the wrapping paper folding means and first sealing means, and product transferring means situated near the first sealing means, said product transferring means guiding the food item wrapped by the wrapping paper toward a product delivery port.

2. An automatic cooking apparatus according to claim 1, further comprising second sealing means situated between the shell storing and delivery means and the stuff storing and delivery means, said second sealing means partly jointing a folded portion of the wrapping paper at the front and rear portions of the food item.

3. An automatic cooking apparatus according to claim 2, wherein said wrapping paper cutting means is situated adjacent to the first sealing means, said cutting means cutting the wrapping paper at sealed portions sealed by said first and second sealing means.

4. An automatic cooking apparatus according to claim 3, wherein said wrapping paper cutting means is situated near the guide means for cutting the wrapping paper when the wrapping paper is guided into the wrapping paper guide means.

5. An automatic cooking apparatus according to claim 4, wherein the wrapping paper transferring means holds upper ends of the wrapping paper folded into the V-shape and transferring the wrapping paper consecutively.

6. An automatic cooking apparatus, comprising:

wrapping paper supply means for supplying a wrapping paper, horizontal wrapping paper guide means situated adjacent to the supply means and having a wrapping paper entry side and a wrapping paper exit side, said guide means guiding and holding the wrapping paper, wrapping paper cutting means for cutting the wrapping paper introduced into the guide means for a predetermined length, shell storing and delivery means situated above the guide means near the entry side thereof, said storing and delivery means providing the shell folded in half one by one into the wrapping paper while folding the wrapping paper along a center line thereof into a V-shape, wrapping paper transfer means situated along the guide means, said transfer means consecutively transferring the wrapping paper having the shell therein in a predetermined pitch along the guide means, a plurality of stuff storing and delivery means situated in a row from a position adjacent the shell storing and delivery means toward the wrapping paper exit side, said storing and delivery means supplying a predetermined amount of food stuffs into the shell in order whenever the wrapping paper is advanced stepwise, wrapping paper sealing means for jointing a periphery of the wrapping paper outside a food item after supplying the stuffs into the shell, and product transferring means for guiding the food item wrapped by the wrapping paper toward a product delivery port.

7. An automatic cooking apparatus according to claim 6, wherein the wrapping paper transferring means holds a folded portion of the wrapping paper folded in the V-shape so as to consecutively transfer the wrapping paper.

8. An automatic cooking apparatus according to claim 7, wherein said wrapping paper guide means includes wrapping paper guiding members formed of a plurality of pairs of right and left wire rods situated parallel to each other and disposed vertically in plural stages so that each space between the right and left wire rods gradually decreases from a top to a bottom, and a receiving plate disposed under the wrapping paper guiding members parallel to and at a center thereto.

9. An automatic cooking apparatus according to claim 8, further comprising a wrapping paper introducing member for introducing a distal end of the wrapping paper sent out by the wrapping paper supplying means, said wrapping paper introducing piece being disposed at a front side of the wrapping paper cutting means.

* * * * *